United States Patent
Storm et al.

(10) Patent No.: US 10,640,236 B2
(45) Date of Patent: May 5, 2020

(54) CLEANING ASSEMBLY FOR LEADING EDGES OF AIRFOILS

(71) Applicant: AIRBUS DEFENCE AND SPACE GMBH, Taufkirchen (DE)

(72) Inventors: Stefan Storm, Unterschleissheim (DE); Johannes Kirn, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 236 days.

(21) Appl. No.: 15/784,790

(22) Filed: Oct. 16, 2017

(65) Prior Publication Data

US 2018/0105291 A1    Apr. 19, 2018

(30) Foreign Application Priority Data

Oct. 19, 2016  (DE) .......................... 10 2016 220 437

(51) Int. Cl.
| | |
|---|---|
| *B64F 5/30* | (2017.01) |
| *B08B 1/00* | (2006.01) |
| *B08B 7/00* | (2006.01) |
| *B08B 13/00* | (2006.01) |

(52) U.S. Cl.
CPC ................ *B64F 5/30* (2017.01); *B08B 1/008* (2013.01); *B08B 7/0028* (2013.01); *B08B 13/00* (2013.01)

(58) Field of Classification Search
CPC .......... B08B 7/0028; B08B 1/008; B64F 5/30
See application file for complete search history.

(56) References Cited

U.S. PATENT DOCUMENTS

| | | | |
|---|---|---|---|
| 5,690,749 A | 11/1997 | Lee | |
| 9,415,462 B2 | 8/2016 | Hugot et al. | |
| 2006/0288508 A1* | 12/2006 | Knopow | A47L 13/24 15/144.1 |
| 2007/0220691 A1* | 9/2007 | McKay | A47L 25/005 15/104.002 |

(Continued)

FOREIGN PATENT DOCUMENTS

| | | |
|---|---|---|
| CN | 204159607 U | 2/2015 |
| DE | 3226629 C1 | 12/1983 |

(Continued)

OTHER PUBLICATIONS

Office Action for Great Britain Application No. 1712853.9 dated Dec. 22, 2017.

(Continued)

*Primary Examiner* — Mikhail Kornakov
*Assistant Examiner* — Natasha N Campbell
(74) *Attorney, Agent, or Firm* — Jenkins, Wilson, Taylor & Hunt, P.A.

(57) ABSTRACT

A cleaning assembly for leading edges of airfoils, in particular airfoil profiles of aircraft or spacecraft, has a cleaning device that is provided with at least one cleaning member and is intended for applying mechanical pressure to a planar region of an airfoil, and has a drive having at least one drive element, which drive moves the cleaning device along the surface to be cleaned. It is proposed to adhesively hold the cleaning device on the airfoil by the at least one cleaning member and/or for the at least one cleaning member to have a sticky surface and for the at least one cleaning member to be dimensionally stable and have flexible contours.

20 Claims, 2 Drawing Sheets

(56) References Cited

U.S. PATENT DOCUMENTS

2017/0175568 A1    6/2017  Flynn et al.

FOREIGN PATENT DOCUMENTS

| EP | 1583905 B1 | 4/2010 |
| FR | 2960904 A1 | 12/2011 |
| JP | H 0448978 A | 2/1992 |
| KR | 1020130025530 A | 3/2013 |
| WO | WO 2012/150413 A1 | 11/2012 |

OTHER PUBLICATIONS

German Office Action for Application No. 102016220437 dated Aug. 22, 2017.
Machine translation of KR 1020130025530 A, EPO, pp. 1-26, retrieved online Aug. 21, 2017.
Office Action for Great Britain Application No. 1712853.9 dated Jul. 11, 2019.

* cited by examiner

CLEANING ASSEMBLY FOR LEADING EDGES OF AIRFOILS

CROSS-REFERENCE TO RELATED APPLICATION

This application claims priority to German patent application DE 10 2016 220 437.8 filed Oct. 19, 2016, the entire disclosure of which is incorporated by reference herein.

TECHNICAL FIELD

The disclosure herein relates to a cleaning assembly for leading edges of airfoils, in particular for airfoil profiles of aircraft or spacecraft, comprising a cleaning device that is provided with at least one cleaning member and is intended for applying mechanical pressure to a planar region of an airfoil profile, and comprising a drive having at least one drive element, which drive moves the cleaning device along the surface to be cleaned. The disclosure herein also relates to a method for operating a cleaning assembly of this kind.

BACKGROUND

Airfoils are known in various forms and applications and are widely used. For example, they can be used in passenger aircraft, in unmanned aircraft such as drones, and in wind turbine blades. In their forward movement direction, the airfoils have a front edge acting as the leading edge, against which the surrounding fluid flows during movement of the airfoil. During the movement through the fluid, all kinds of dirt are deposited on the leading edge of the airfoil. This can influence the air resistance of the profile or the flow that forms thereon, which is why recurrent cleaning of the leading edge is expedient and desirable, in order to keep energy and fuel consumption low or to reduce power losses.

While known cleaning assemblies do clean the leading edge of the airfoil thoroughly, they do so at an unfavorable time, since in commercial aircraft, for example, a substantial proportion of the dirt is deposited on the leading edges of airfoil profiles during the take-off phase and dirt has already stopped accumulating before the aircraft reaches its service ceiling. In addition, in known cleaning devices, the leading edges of the airfoil profiles undergo a wiping or scraping cleaning process in order to remove the deposited dirt, yet this can bring with it mechanical removal of material from the surface of the airfoil. This may at the very least impair the functioning of hybrid laminar flow control (HLFC) surfaces.

SUMMARY

Therefore, an idea of the disclosure herein is to provide a cleaning assembly that allows thorough cleaning of leading edges of airfoils while having a simple design, low weight and low energy consumption.

Accordingly, this idea is achieved in particular by the cleaning device in a cleaning assembly according to the disclosure herein being adhesively held on the airfoil by the at least one cleaning member and/or the at least one cleaning member having a sticky surface, and the at least one cleaning member being dimensionally stable and having flexible contours.

According to the disclosure herein, therefore, the cleaning device is adhesively held on the edge of the airfoil by the at least one cleaning member, a boundary surface layer being formed between the cleaning member and the airfoil surface to be cleaned and the molecular interactions of the layer causing the surface being cleaned and the cleaning member to be mechanically held together, such that they adhere to one another without any other holder or holding means. At the same time, the at least one cleaning member can also have a sticky surface, which is why the cleaning of the airfoil surface is based on a shearing action exerted by the sticky surface (similar to a lint remover) on the airfoil surface to be cleaned. In this case, the sticky surface can be both porous and smooth. The cleaning here is not actually a wiping, rubbing or scraping cleaning action. Finally, however, in order to prevent the cleaning device detaching from the airfoil unintentionally and at random, the cleaning device can be provided with a separate securing structure or means, for example a strip extending along the leading edge. By the adhesive holding force, disadvantageous aspects of direct mechanical removal of material from the surface to be cleaned can be avoided, while the cleaning device has a simple design, is lightweight and uses little energy.

In one embodiment of the cleaning assembly according to the disclosure herein, the cleaning device having the at least one cleaning member can encompass at least some regions of an edge of the airfoil when in the use position. In this way, the cleaning device arranged and held on the airfoil can be moved along a leading edge to be cleaned and can clean because of the application of mechanical pressure; since the leading edge is encompassed by the device, it can be cleaned in one or more cleaning processes in which the cleaning member is moved along the leading edge. At the same time, the dimensional stability and flexible contours of the cleaning member ensure that the cleaning member can apply pressure to the leading edge even when the cross section of the airfoil profile changes. By the cleaning assembly according to the disclosure herein, the cleaning process can be carried out, in particular on an aircraft, in principle at any time, i.e. even during the take-off phase when a particularly high amount of dirt is deposited on the leading edge of the airfoil.

To hold and secure the cleaning device on the relevant airfoil, in particular captively, in one expedient development of the cleaning device, the device can be provided with a separate securing structure or means.

In one design of the cleaning assembly according to the disclosure herein in which the assembly uses the flow to which the airfoil is subject to move itself, the edge of the airfoil is formed by a leading edge of an airfoil, e.g. of an aircraft, and/or the cleaning device can move along a leading edge of an airfoil.

To be able to drive the cleaning device in particular in a controllable manner and thus to be able to move it in one or more desired directions, another advantageous embodiment of the cleaning assembly can be provided with a drive having at least one drive element on either side of the edge of the airfoil, the drive permitting, controlling and/or driving the movements of the cleaning device having the at least one cleaning member.

In the process, for example, a flexible drive member that connects two opposite drive elements can be advantageously arranged between the drive elements. In this case, each side can also be provided with a plurality of drive elements, which each can encounter a counterpart on the opposite side of the airfoil edge, to which they are each connected by a drive member of this type. However, individual drive elements not connected to a counterpart are also conceivable. The relevant drive members can, for example, be formed as flexible rollers that rotate about their own longitudinal axis as the drive device moves forward.

In a further development of the cleaning assembly according to the disclosure herein, drive elements can each be connected to a support member on each side of the airfoil, thus creating support for the torque of the drive on each side of the airfoil.

The support member can be formed here by a bar that is arranged on each side of the airfoil so as to extend approximately in parallel with the longitudinal extension thereof, substantially transversely to the movement direction, and overall forms a connection to the drive elements assigned to the relevant side. However, other designs of the support member(s) are also conceivable.

In one embodiment of the cleaning assembly, the drive elements of the cleaning device can be formed by drive motors, in particular by brushless electric motors that are simple to produce and insert, that, in principle, can be operated using the same actuation as a DC machine and ensure simple start-up under load and simple speed control.

A satisfactory cleaning result can be reliably achieved by one embodiment of the cleaning assembly in which the at least one cleaning member is formed by a strip extending between two drive members spaced apart along the airfoil edge. At the same time, the strip in question creates a planar cover for a portion of the surface to be cleaned, and is pulled along or past the surface in a manner driven by the drive of the cleaning device by the drive motors.

In a further development of the cleaning assembly, the cleaning member can be formed by a strip that forms a continuous belt connected at its ends, in the manner of a conveyor belt. In this case, in addition to the translational movement performed by the cleaning device as a result of it being driven, the cleaning member is moved around two deflection rollers through which the continuous belt runs. The deflection rollers can, for example, each be formed by two drive rollers that each connect two opposite drive elements.

In another embodiment of the cleaning assembly, the cleaning device can be provided with a plurality of cleaning members that are in particular arranged regularly. In this case, the movement of the cleaning member can be coupled to the driven movement of the cleaning device and can carry out an additional movement, unlike before. However, it is also conceivable for one, some or all of the individual cleaning members to carry out an additional rotational movement about an axis of rotation arranged approximately transversely to the movement direction of the cleaning device.

In a cleaning device comprising a plurality of cleaning members, a good cleaning action can be achieved in one embodiment in which a plurality of cleaning members each form or can each form a row in the manner of a chain with adjacent members, which row extends between opposite support members, and/or the cleaning device is provided with a plurality of rows of cleaning members. In this case, for example, the cleaning members of various but approximately adjacent rows can be offset from one another, such that, in any case, one of the cleaning members applies pressure to the airfoil surface to be completely cleaned in the region of the leading edge, or a plurality of the cleaning members apply pressure when there is a sufficient number of rows.

To also protect the cleaning device of the cleaning assembly according to the disclosure herein from mechanical stress from the flowing fluid or from substances carried therein, the cleaning device can be provided with a cover device that has a flexible shape and follows the adjustment of the cleaning device shape to the airfoil profile. For example, a planar cover of the aforementioned continuous belt acting as a cleaning member, together with its roller-like drive members, can be provided as a cover device in such a way that it is always at approximately the same distance from the span of the continuous belt facing away from the leading edge of the airfoil, so as to not adversely affect the movement of the belt.

In another embodiment of the cleaning assembly according to the disclosure herein, the cleaning device can comprise a movable stabilizing surface, which can be arranged on the cover device. This stabilizing surface can be formed in the manner of a fin and, for example, be pivotable about its for example linear pivot point. When stood appropriately upright on the cleaning device, the surface assists the advance movement of the device on the airfoil outwards and backwards or inwards and forwards.

To allow the position of the cleaning device on the airfoil to be determined at all times, for example for precise control, in another development of the cleaning assembly the cleaning device can be provided with at least one sensor that allows the position of the cleaning device as mentioned to be determined. For example, this sensor can be a magnetic sensor or an optical sensor. In principle, other sensors having the same accuracy, for example a GPS sensor, could also be conceivable.

In the region of the at least one cleaning member of the cleaning device, a device can be provided on which or by which the cleaning member is given the ability to remove collected dirt, e.g. by wiping it off its structure. This device can, for example, by formed by a movable, for example pivotable, projection. However, the device can also have a different design.

The aforementioned idea is also achieved by a method for operating a cleaning assembly, comprising at least the following steps:

providing a driven cleaning device having at least one sticky cleaning member;

arranging the cleaning device on the airfoil and establishing adhesive contact with the surface to be cleaned; and performing at least one cleaning process by moving the cleaning device along a leading edge of the airfoil.

At this juncture, reference is made to the above embodiments.

Where practical, the above embodiments and developments can be combined in any manner. Other possible embodiments, developments and implementations of the disclosure herein also include any combinations of features of the disclosure herein described above or below in relation to the embodiments that are not explicitly stated. In particular, a person skilled in the art will also add individual aspects as improvements or additions to the basic form of the present disclosure.

BRIEF DESCRIPTION OF THE DRAWINGS

The disclosure herein will be described in more detail below on the basis of embodiments in the drawings, in which, in partly schematic views.

In all the drawings, like elements and apparatuses and those having the same function are provided with the same reference numerals, unless stated otherwise.

DETAILED DESCRIPTION

Figure 1:
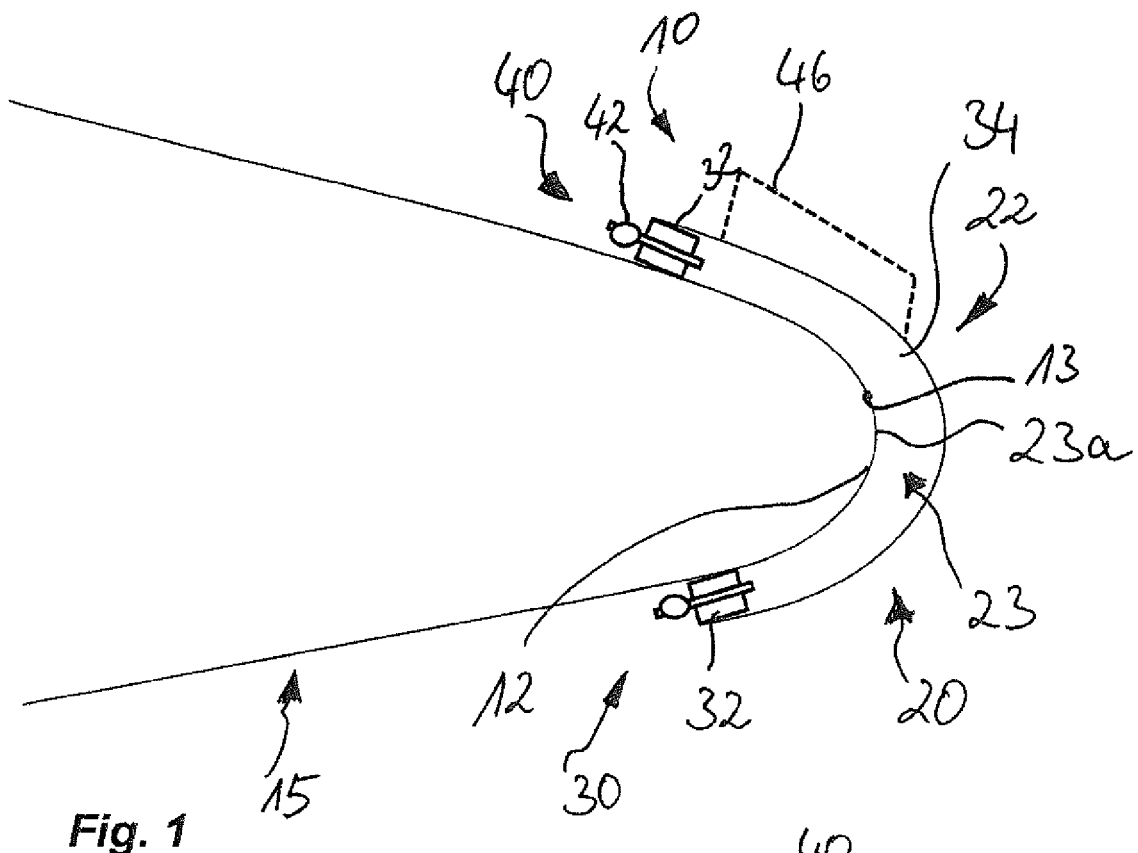
FIG. 1 is a sectional side view of a first embodiment of a cleaning assembly according to the disclosure herein, comprising a cleaning device that is arranged on a leading edge and has a continuous belt as a cleaning member and an optional stabilizing surface.

All of FIGS. 1 through 5 show a cleaning assembly, denoted in general by 10, for leading edges 12 of airfoils 15, in particular for airfoil profiles of aircraft or spacecraft, comprising a cleaning device 20 that is provided with at least one cleaning member 22, 24 and is intended for applying mechanical pressure to a planar region of an airfoil 15. It can also be seen that the cleaning device 20 is provided with a drive 30, which is in turn provided with two drive elements 32, which in the use position of the cleaning device 20. The drive 30 moves the cleaning device 20 along the surface to be cleaned, and more specifically along the leading edge 12 of the airfoil 15.

It can also be seen that the cleaning device 20 is held on the airfoil 15 in each case by its cleaning member 22 or cleaning members 24, that the cleaning device 20 encompasses at least some regions of the leading edge 12 of the airfoil 15 by its cleaning members 22, 24, and that the cleaning members 22, 24 are dimensionally stable and have flexible contours and can encompass the leading edge of the airfoil 15 because of these properties.

Figure 2:
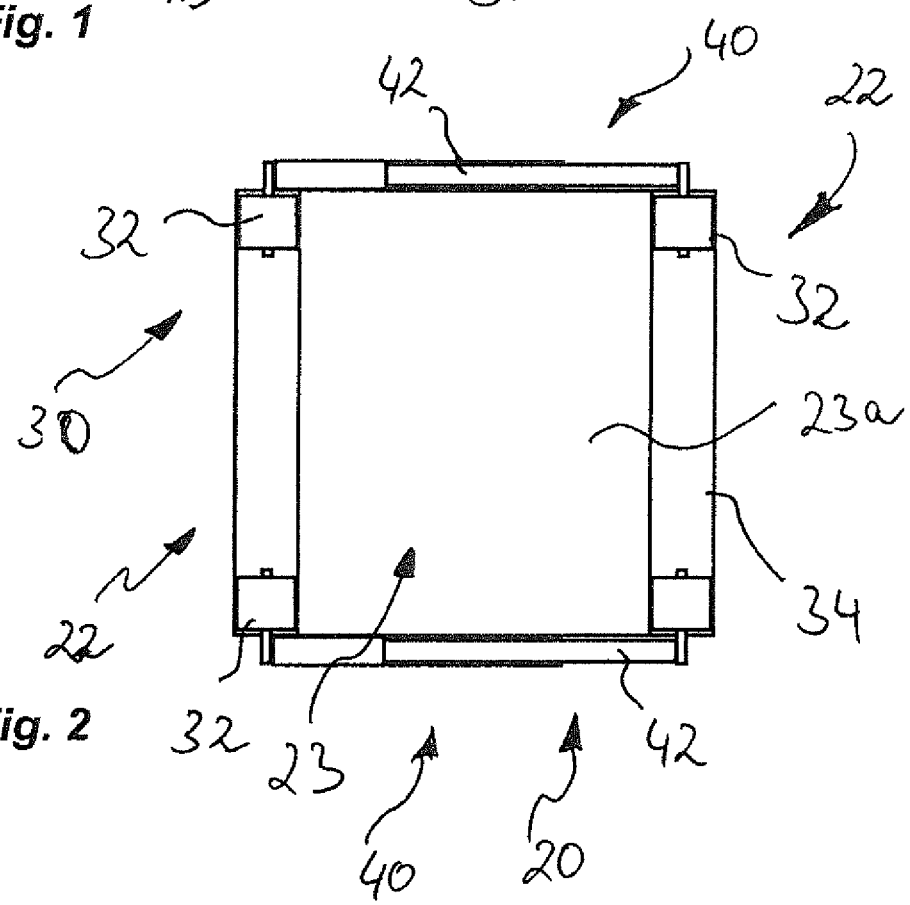
FIG. 2 is a planar plan view from below of a modified illustration of the cleaning device from FIG. 1, comprising a cleaning member, support members, drive elements and drive members.
Figure 3:
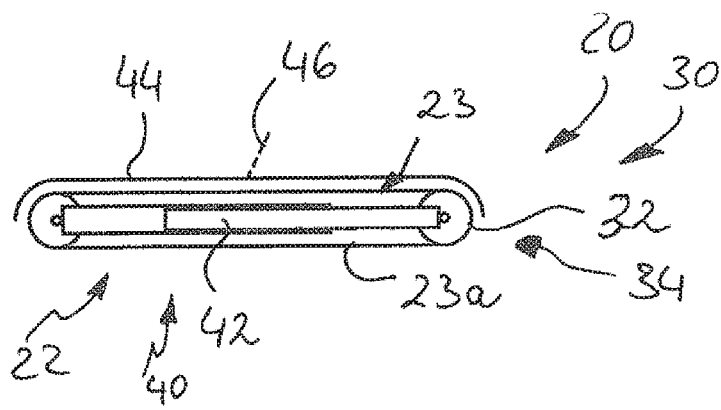
FIG. 3 is a sectional side view of the cleaning device from FIGS. 1 and 2, having an optional stabilizing surface.
Figure 4:
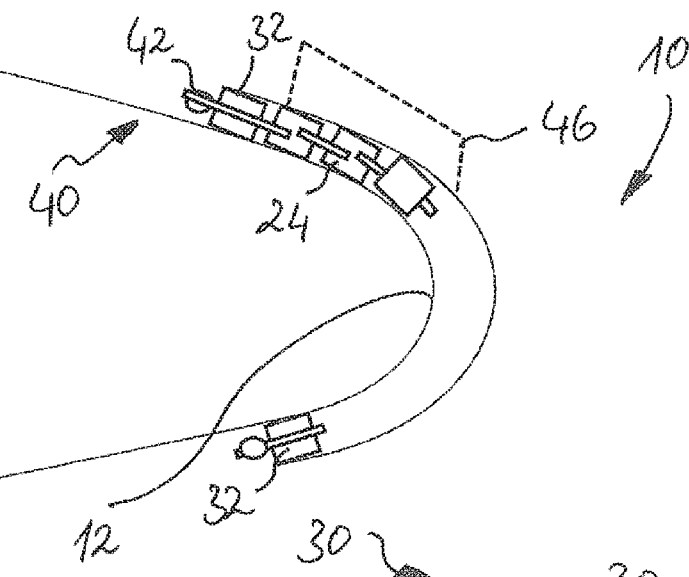
FIG. 4 is a sectional side view of another embodiment of a cleaning assembly according to the disclosure herein, comprising a cleaning device that is arranged on a leading edge and is provided with a plurality of cleaning members.

Looking now to FIGS. 1 through 3, FIG. 1 shows the cleaning assembly 10 according to the disclosure herein, comprising a cleaning device 20 arranged on a leading edge 10 or front edge of an airfoil 15. The cleaning device 20 is provided with a single cleaning member 22 that is formed having a continuous belt 23 in the manner of a conveyor belt and the span 23a of which facing the airfoil is in adhesive contact with the surface 13 of the airfoil 15. The continuous belt 23 is made of a non-woven fabric material to establish the adhesive contact with the surface 13.

In the end regions of the cleaning device 20 located on different sides of the leading edge 12 of the airfoil 15, it is possible to see drive elements 32 of the drive, which drives the cleaning device 20 in a direction parallel to the direction of view, i.e. into or out of the plane of the page or drawing plane. The drive elements 32 of the drive 30 are interconnected by a drive member 34 that engages around the leading edge 12 of the airfoil 15 when in the use position in FIG. 1. Also shown is a support member 40 that comprises a bar 42, faces away from each drive member 34 on the drive elements 32, extends in the direction of view and supports the torque exerted by the drive 30.

Taking FIG. 2, which shows a modified illustration of the cleaning device 20, together with FIG. 3, in which the cleaning device 20 is shown in a planar side view, it becomes clear that the cleaning device 20 is practically nestled around the leading edge 12 of the airfoil 15 by its cleaning member 22 when in the use position shown in FIG. 1. The drive elements 32 drive the roller-like drive members 34 rolling on the inner side of the continuous belt 23 of the cleaning member 22, as a result of which the belt is moved along the surface 13 of the leading edge 12. Owing to the adhesive or sticky contact of the non-woven-like cleaning member with the surface 13 of the leading edge, dirt is removed from the surface 13.

In FIGS. 1 and 3, a fin-like stabilizing surface 46 that assists the advance of the movement of the cleaning device 20 together with its cleaning member 22 along the front edge 12 of the airfoil 15 can be easily seen on the side of the cleaning device facing away from the surface 13; the dashed line in the drawings is intended to show the optional arrangement of the fin-like stabilizing surface.

It is more clearly visible in FIG. 3 that the stabilizing surface is actually arranged on a cover device 44 that is arranged on the cleaning device 20 so as to face away from the leading edge 12 of the airfoil 15. This cover device 44 in turn protects the cleaning device, together with its cleaning member 22, from dirt, and was omitted in the illustration in FIG. 1 for reasons of clarity.

Figure 5:
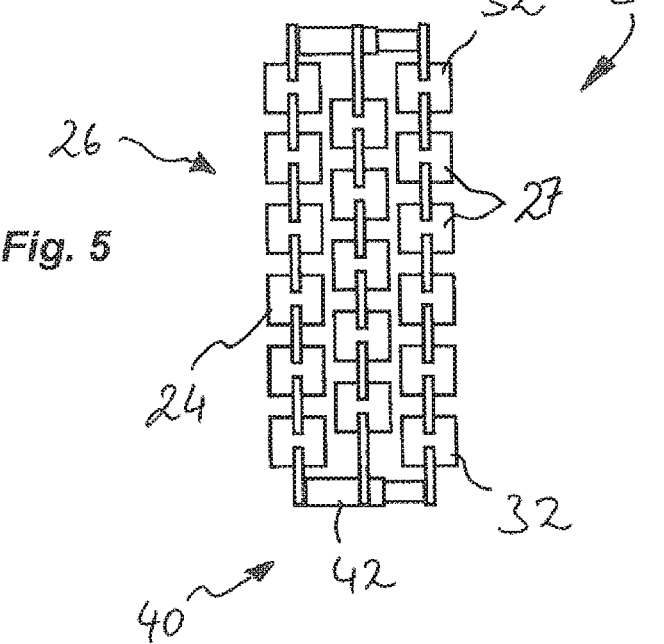
FIG. 5 is a planar plan view of a modified illustration of the cleaning device from FIG. 4, in which the cleaning members arranged one after the other in rows in the manner of chains are more easily visible and the device comprises support members and drive elements.

The cleaning assembly 10 shown in FIG. 4 through 5 is, in principle, similar to that in FIGS. 1 through 3, FIG. 4 again first showing the arrangement of the cleaning device 20 on the airfoil 15 by adhesive contact, while FIG. 5 shows a modified illustration of the cleaning device 20 having cleaning members 24. The formation of the cleaning members 24 in comparison with those in the cleaning assembly from FIGS. 1 through 3 is the main difference between the two embodiments. In this case, the cleaning members 24 are now formed by single rollers 27 again having a sticky surface, so the adhesive contact is in principle the same. However, there is no continuous belt 23 rotating around roller-like drive members 34, but instead rollers 27 are rotating about their own axis of symmetry, driven again by drive elements 32. A plurality of such rollers 27 are each connected together in rows to form a chain 26, and in turn a plurality of chains are arranged between the support members 40 so as to extend in such a way that two adjacent cleaning members 24 belonging to different chains 26 are arranged so as to be offset from one another transversely to the advance direction. For the viewer, therefore, their movement takes place in parallel with the plane of view of FIG. 5, and achieves a similar cleaning result to the cleaning assembly 10 in FIGS. 1 through 3.

Therefore, the above disclosure herein accordingly relates to a cleaning assembly 10 for leading edges 12 of airfoils 15, in particular for airfoil profiles of aircraft or spacecraft, comprising a cleaning device 20 that is provided with at least one cleaning member 22, 24 and is intended for applying mechanical pressure to a planar region of an airfoil 15, and comprising a drive 30 having at least one drive element 32, which drive 30 moves the cleaning device 20 along the surface to be cleaned.

In order to obtain a cleaning assembly 10 that thoroughly cleans leading edges 12 of airfoils 15 while having a simple design, low weight and low energy consumption, the cleaning device 20 is adhesively held on the airfoil 15 by the at least one cleaning member 22, 24 and/or the at least one cleaning member 22, 24 has a sticky surface and the at least one cleaning member 22, 24 is dimensionally stable and has flexible contours.

Although the present disclosure has been described above on the basis of various embodiments, it is not limited thereto, but rather can be modified in many different ways. In particular, the disclosure herein can be changed or modified in many ways without departing from the central concept of the disclosure herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cleaning assembly for cleaning a leading edge of an airfoil, the cleaning assembly comprising:
   a cleaning device comprising at least one cleaning member, which is dimensionally stable and has flexible contours, for applying mechanical pressure to a planar region of the airfoil; and
   a drive having at least one drive element on either side of the leading edge of the airfoil, wherein the drive is configured to move the cleaning device along the leading edge of the airfoil to be cleaned;
   wherein the cleaning device is adhesively held onto the leading edge of the airfoil by the at least one cleaning member.

2. The cleaning assembly of claim 1, wherein the cleaning device encompasses at least some regions of the leading edge of the airfoil by the at least one cleaning member when in a use position.

3. The cleaning assembly of claim 1, wherein the cleaning device comprises a securing structure.

4. The cleaning assembly of claim 1, comprising a flexible drive member that connects and is arranged between the two drive elements.

5. The cleaning assembly of claim 1, wherein the drive elements are each connected to a support member on each side of the airfoil.

6. The cleaning assembly of claim 5, wherein the support member is in a form of a bar.

7. The cleaning assembly of claim 1, wherein the drive elements are drive motors.

8. The cleaning assembly of claim 1, wherein the at least one cleaning member comprises a strip that extends between two drive members spaced apart from one another along an edge of the airfoil.

9. The cleaning assembly of claim 8, wherein the cleaning member comprises a strip that forms a continuous belt that is connected at its ends, in a manner of a conveyor belt.

10. The cleaning assembly of claim 1, wherein the cleaning device comprises a plurality of cleaning members.

11. The cleaning assembly of claim 10, wherein the cleaning members are arranged regularly.

12. The cleaning assembly of claim 1, comprising a plurality of cleaning members that are able to be arranged to form a row in a manner of a chain with adjacent cleaning members, wherein the row extends between opposite support members.

13. The cleaning assembly of claim 1, wherein the cleaning device comprises a plurality of rows of cleaning members.

14. The cleaning assembly of claim 1, wherein the cleaning device comprises a cover device that has a flexible shape and is configured to follow an adjustment of a shape of the cleaning device to the airfoil.

15. The cleaning assembly of claim 1, wherein the cleaning device has a stabilizing surface.

16. The cleaning assembly of claim 15, wherein the stabilizing surface is arranged on a cover device.

17. The cleaning assembly of claim 1, wherein the cleaning device comprises at least one sensor configured to determine a position of the cleaning device on the airfoil.

18. A cleaning assembly for cleaning a leading edge of an airfoil, the cleaning assembly comprising:
   a cleaning device that comprises at least one cleaning member, which is dimensionally stable and has flexible contours, for applying mechanical pressure to a planar region of the airfoil; and
   a drive having at least one drive element on either side of the leading edge of the airfoil, wherein drive is configured to move the cleaning device along the leading edge of the airfoil to be cleaned;
   wherein the at least one cleaning member has a sticky surface.

19. A method for operating a cleaning assembly to clean a leading edge of an airfoil, comprising at least:
   providing a driven cleaning device having at least one sticky cleaning member, which is dimensionally stable and has flexible contours;
   arranging the cleaning device on the airfoil and establishing adhesive contact with the leading edge of the airfoil to be cleaned; and
   moving, using a drive having at least one drive element on either side of the leading edge of the airfoil, the cleaning device along the leading edge of the airfoil to clean the leading edge of the airfoil.

20. The cleaning assembly of claim 7, wherein the drive elements are brushless electric motors.

* * * * *